(12) United States Patent
Petersen

(10) Patent No.: US 9,654,583 B2
(45) Date of Patent: *May 16, 2017

(54) SYSTEM AND METHOD FOR INCREASING DATA AVAILABILITY ON A MOBILE DEVICE BASED ON OPERATING MODE

(71) Applicant: DOMINGO ENTERPRISES, LLC, Wilmington, DE (US)

(72) Inventor: Steven L. Petersen, Los Gatos, CA (US)

(73) Assignee: DOMINGO ENTERPRISES, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,431

(22) Filed: Aug. 12, 2014

(65) Prior Publication Data

US 2014/0359049 A1  Dec. 4, 2014

Related U.S. Application Data

(63) Continuation of application No. 11/754,757, filed on May 29, 2007, now Pat. No. 8,832,220.

(51) Int. Cl.
  *G06F 15/16* (2006.01)
  *H04L 29/08* (2006.01)

(52) U.S. Cl.
  CPC .......... *H04L 67/2842* (2013.01); *H04L 67/04* (2013.01); *H04L 67/1095* (2013.01); *H04L 67/322* (2013.01)

(58) Field of Classification Search
  CPC ............................ H04L 67/04; H04L 67/1095

(Continued)

(56) References Cited

U.S. PATENT DOCUMENTS 5,581,704 A  12/1996 Barbara et al.
5,616,876 A   4/1997 Cluts
(Continued)

FOREIGN PATENT DOCUMENTS

EP   1686497   8/2006
WO   WO 01/77907   10/2001
(Continued)

OTHER PUBLICATIONS

"AOL Music Now," at <http://web.archive.org/web/20060508184531/aol.musicnow.com/az/home.jhtml?_requesti . . . >, copyright 2006, AOL Music Now LLC, printed Nov. 16, 2007, 1 page.

(Continued)

*Primary Examiner* — Phuoc Nguyen

(57) ABSTRACT

A system for a mobile device to provide access to a data collection, such as a user's data collection for example, without requiring either persistent storage of the complete data collection locally on the mobile device, or network access requests for each user data request from the mobile device. In an embodiment, the system employs a data probability function to predict the probability of the mobile device accessing specific types of user data based on the operating mode of the mobile device. The system executes as a background process to provide and store locally on the mobile device, the data most probable to be accessed at the mobile device. The data most likely to be accessed via the mobile device is available locally, thereby minimizing latency issues that occur when data requests cannot be fulfilled using data stored locally in the mobile device and network requests are performed.

32 Claims, 13 Drawing Sheets

(58) Field of Classification Search
USPC .................................................. 709/203, 217
See application file for complete search history.

(56) References Cited

U.S. PATENT DOCUMENTS

| | | | |
|---|---|---|---|
| 5,706,435 A | 1/1998 | Barbara et al. | |
| 5,754,939 A | 5/1998 | Herz et al. | |
| 5,758,347 A | 5/1998 | Lo et al. | |
| 5,857,207 A | 1/1999 | Lo et al. | |
| 5,870,764 A | 2/1999 | Lo et al. | |
| 5,918,223 A | 6/1999 | Blum et al. | |
| 6,201,176 B1 | 3/2001 | Yourlo | |
| 6,493,762 B1 | 12/2002 | Chen et al. | |
| 6,657,116 B1 | 12/2003 | Gunnerson | |
| 6,865,600 B1 | 3/2005 | Brydon et al. | |
| 6,933,433 B1 | 8/2005 | Porteus et al. | |
| 7,000,188 B1 | 2/2006 | Eustace | |
| 7,028,082 B1 | 4/2006 | Rosenberg et al. | |
| 7,096,486 B1 | 8/2006 | Ukai et al. | |
| 7,143,241 B2 | 11/2006 | Hull | |
| 7,146,627 B1 | 12/2006 | Ismail et al. | |
| 7,185,355 B1 | 2/2007 | Ellis et al. | |
| 7,296,285 B1 | 11/2007 | Jun et al. | |
| 7,321,923 B1 | 1/2008 | Rosenberg et al. | |
| 7,403,787 B2 | 7/2008 | Helferich | |
| 7,529,743 B1 | 5/2009 | Ershov | |
| 7,567,525 B2 | 7/2009 | Liao et al. | |
| 7,570,943 B2 | 8/2009 | Sorvari et al. | |
| 7,580,932 B2 | 8/2009 | Plastina et al. | |
| 7,912,994 B2* | 3/2011 | Cornwell et al. | 710/14 |
| 2001/0023401 A1 | 9/2001 | Weishut et al. | |
| 2002/0002483 A1 | 1/2002 | Siegel et al. | |
| 2002/0037083 A1 | 3/2002 | Weare et al. | |
| 2002/0087565 A1 | 7/2002 | Hoekman et al. | |
| 2002/0129168 A1 | 9/2002 | Kanai et al. | |
| 2002/0194285 A1 | 12/2002 | Mousseau et al. | |
| 2002/0199194 A1 | 12/2002 | Ali | |
| 2003/0005047 A1 | 1/2003 | Seki et al. | |
| 2003/0009538 A1* | 1/2003 | Shah et al. | 709/219 |
| 2003/0045953 A1 | 3/2003 | Weare | |
| 2003/0045954 A1 | 3/2003 | Weare et al. | |
| 2003/0126232 A1* | 7/2003 | Mogul et al. | 709/219 |
| 2003/0135513 A1 | 7/2003 | Quinn et al. | |
| 2003/0140123 A1 | 7/2003 | Master et al. | |
| 2004/0030832 A1 | 2/2004 | Squibbs | |
| 2004/0078383 A1 | 4/2004 | Mercer | |
| 2004/0093466 A1 | 5/2004 | Hull | |
| 2004/0160971 A1 | 8/2004 | Krause et al. | |
| 2005/0021420 A1 | 1/2005 | Michelitsch et al. | |
| 2005/0120053 A1 | 6/2005 | Watson | |
| 2005/0144221 A1* | 6/2005 | Shin et al. | 709/203 |
| 2005/0177568 A1 | 8/2005 | Diamond et al. | |
| 2005/0240661 A1 | 10/2005 | Heller et al. | |
| 2005/0246740 A1 | 11/2005 | Teraci et al. | |
| 2006/0004923 A1 | 1/2006 | Cohen et al. | |
| 2006/0008256 A1 | 1/2006 | Khedouri et al. | |
| 2006/0020538 A1 | 1/2006 | Ram et al. | |
| 2006/0032363 A1 | 2/2006 | Platt | |
| 2006/0064721 A1 | 3/2006 | Del Val et al. | |
| 2006/0069769 A1 | 3/2006 | Dacosta | |
| 2006/0083119 A1 | 4/2006 | Hayes | |
| 2006/0100978 A1 | 5/2006 | Heller et al. | |
| 2006/0112082 A1 | 5/2006 | Platt et al. | |
| 2006/0117260 A1 | 6/2006 | Sloo et al. | |
| 2006/0230065 A1 | 10/2006 | Plastina et al. | |
| 2006/0240868 A1 | 10/2006 | Kaplan et al. | |
| 2006/0242661 A1 | 10/2006 | Bodlaender et al. | |
| 2006/0254409 A1 | 11/2006 | Withop | |
| 2007/0005795 A1 | 1/2007 | Gonzalez | |
| 2007/0011150 A1 | 1/2007 | Frank | |
| 2007/0053268 A1 | 3/2007 | Crandall et al. | |
| 2007/0078832 A1 | 4/2007 | Ott, IV et al. | |
| 2007/0078895 A1 | 4/2007 | Hsieh et al. | |
| 2007/0089057 A1 | 4/2007 | Kindig | |
| 2007/0094215 A1 | 4/2007 | Toms et al. | |
| 2007/0130207 A1 | 6/2007 | Pate et al. | |
| 2007/0169148 A1 | 7/2007 | Oddo et al. | |
| 2007/0208802 A1 | 9/2007 | Barman et al. | |
| 2007/0250601 A1* | 10/2007 | Amlekar et al. | 709/219 |
| 2007/0255797 A1 | 11/2007 | Dunn et al. | |
| 2008/0005301 A1 | 1/2008 | Li et al. | |
| 2008/0040474 A1 | 2/2008 | Zuckerberg et al. | |
| 2008/0059422 A1 | 3/2008 | Tenni et al. | |
| 2008/0062318 A1 | 3/2008 | Ellis et al. | |
| 2008/0126191 A1 | 5/2008 | Schiavi | |
| 2008/0140717 A1 | 6/2008 | Rosenberg et al. | |
| 2008/0205291 A1* | 8/2008 | Li et al. | 370/254 |
| 2008/0228938 A1* | 9/2008 | Plamondon | 709/233 |
| 2009/0254572 A1 | 10/2009 | Redlich et al. | |

FOREIGN PATENT DOCUMENTS

| | | |
|---|---|---|
| WO | WO 03/019560 | 3/2003 |
| WO | WO 2005/038666 | 4/2005 |
| WO | WO 2005/052814 | 6/2005 |
| WO | WO 2007/032003 | 3/2007 |
| WO | WO 2007/044389 | 4/2007 |
| WO | WO 2007/092781 | 8/2007 |

OTHER PUBLICATIONS

"Apple—iPod + iTunes," at <http://www.apple.com/itunes/>, copyright 2007 by Paramount Pictures, printed Feb. 7, 2007, 2 pages.

"Apple—iPod classic," at <http://www.apple.com/ipodclassic/>, printed Oct. 26, 2007, 1 page.

"Developer News Archive," Audacity Wiki, page last modified on Sep. 10, 2008, contains information dating back to May 4, 2008, retrieved Jun. 4, 2009 from <http://audacityteam.org/wiki/index.php?title=Developer_News_Archive>, 10 pages.

"Goombah" Preview, at <http://www.goombah.com/preview.html>, printed Jan. 8, 2008, 5 pages.

Holzner, Steven, overview of book "Inside JavaScript," published Aug. 28, 2002, New Riders, website copyright 2009, Safari Books Online, 7 pages.

"Motorola Phones Tools—Features—Motorola US," http://direct.motorola.com/ens/MPT/MPT_Feature.asp, copyright 2005-2007 Motorola inc., printed Nov. 16, 2007, 1 page.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"MyStrands Download," at <http://www.mystrands.com/overview.vm>, copyright 2003-2007, MediaStrands, Inc., printed Feb. 7, 2007, 3 pages.

Pouwelse et al., "P2P-based PVR Recommendation using Friends, Taste Buddies and Superpeers," Workshop: Beyond Personalization 2005, IUI 2005, Jan. 9, 2005, San Diego, California, 6 pages.

Xiong, Li and Liu, Ling, "PeerTrust: Supporting Reputation-Based Trust for Peer-to-Peer Electronic Communities," IEEE Transactions on Knowledge and Data Engineering, vol. 16, No. 7, Jul. 2004, copyright 2004, IEEE, 15 pages.

Hill et al., "Recommending and Evaluating Choices in a Virtual Community of Use," at <http://delivery.acm.org/10.1145/230000/223929/p1 . . . 1=GUIDE&dl=GUIDE&CFID=101371626&CFTOKEN=47493911>, Proceedings of CHI 1995, May 7-11, 1995, Denver, Colorado, printed Sep. 10, 2010, 15 pages.

"Rhapsody—Full-length music, videos and more—Free," http://www.rhapsody.com/welcome.html, copyright 2001-2007 Listen.com, printed Feb. 7, 2007, 1 page.

Lamantia, Joe, "Second Generation Tag Clouds," Feb. 23, 2006, at <http://www.joelamantia.com/blog/archives/ideas/second_generation_tag_clouds.html>, copyright 2006, Joe Lamantia, printed Nov. 29, 2007, 19 pages.

Kaser, Owen et al., "Tag-Cloud Drawing: Algorithms for Cloud Visualization," WWW2007, May 8-12, 2007, Banff, Canada, available at <http://www2007.org/workshops/paper_12.pdf>, 10 pages.

"Welcome to Facebook!—Facebook," at <http://www.facebook.com/>, copyright 2008, Facebook, printed Jan. 9, 2008, 1 page.

(56) References Cited

OTHER PUBLICATIONS

"YouTube—Broadcast Yourself.," at <http://www.youtube.com/>, copyright 2007, YouTube, LLC, printed Oct. 26, 2007, 2 pages.

* cited by examiner

| Google Calendar Event Time (208) | Weight (210) |
|---|---|
| This week | 100 |
| Wife's birthday, wedding anniversary | 99 |
| Next week | 90 |
| 2 weeks from now | 80 |
| Last week | 70 |
| 2 weeks ago | 60 |
| Birthdays, holidays | 50 |
| 3 weeks from now | 40 |
| 4 weeks from now | 30 |
| 5 weeks from now | 20 |
| 6 weeks from now | 10 |

*FIG. 10*

| AOL Music Now music category (222) | Weight (224) |
|---|---|
| Artist – U2 | 100 |
| Artist – Fatboy Slim | 90 |
| Genre – Pop | 80 |
| Genre – Rock | 80 |
| Playlist – Greatest Hits from the 70's | 70 |
| Playlist – 80s Party Tunes | 60 |
| AOL Staff Picks | 50 |
| Genre – Classical | 40 |
| Genre – Disco | 0 |
| Other Music | 30 |

*FIG. 11*

DATA IN CACHE (24) IN "PRODUCTIVITY" MODE

226 ↘  228 ↙

| | |
|---|---|
| Appointments This week | 100 |
| Wife's birthday, wedding anniversary | 99 |
| Appointments Next week | 90 |
| Received mails today | 90 |
| Sent mails today | 81 |
| Appointments 2 weeks from now | 80 |
| Received mails last week | 72 |
| Appointments Last week | 70 |
| Sent mails last week | 63 |
| Appointments 2 weeks ago | 60 |
| Received mails from the boss | 54 |
| Birthdays, holidays | 50 |
| Today's headlines | 50 |
| Business news | 45 |
| Sent mails to the boss | 45 |
| Appointments 3 weeks from now | 40 |
| Financial news | 40 |
| Received mails from the wife | 36 |
| Technology news | 35 |
| Appointments 4 weeks from now | 30 |
| IP Law news | 30 |
| Sent mails to the wife | 27 |
| Most Popular stories | 25 |
| Appointments 5 weeks from now | 20 |
| Other received mail | 18 |
| Appointments 6 weeks from now | 10 |
| Other sent mail | 9 |
| News of the weird | 0 |
| Artist – U2 | 0 |
| Local news | 0 |
| Other news | 0 |
| Genre – Rock | 0 |
| Artist – Fatboy Slim | 0 |
| Genre – Pop | 0 |
| Sports news | 0 |
| Playlist – Greatest Hits from the 70's | 0 |
| Playlist – 80s Party Tunes | 0 |
| AOL Staff Picks | 0 |
| Genre – Classical | 0 |
| Genre – Disco | 0 |
| Other Music | 0 |

*FIG. 12*

DATA IN CACHE (24) IN "ENTERTAINMENT" MODE

230 ↘  232 ↙

| | |
|---|---|
| Artist – U2 | 100 |
| Artist – Fatboy Slim | 90 |
| Genre – Rock | 80 |
| Genre – Pop | 80 |
| Playlist – Greatest Hits from the 70's | 70 |
| Playlist – 80s Party Tunes | 60 |
| Appointments This week | 60 |
| Wife's birthday, wedding anniversary | 59.4 |
| Appointments Next week | 54 |
| AOL Staff Picks | 50 |
| Appointments 2 weeks from now | 48 |
| Appointments Last week | 42 |
| Genre – Classical | 40 |
| Today's headlines | 40 |
| News of the weird | 36 |
| Appointments 2 weeks ago | 36 |
| Sports news | 32 |
| Other Music | 30 |
| Birthdays, holidays | 30 |
| Technology news | 28 |
| Appointments 3 weeks from now | 24 |
| Local news | 24 |
| Most Popular stories | 20 |
| Appointments 4 weeks from now | 18 |
| Other news | 16 |
| Appointments 5 weeks from now | 12 |
| Appointments 6 weeks from now | 6 |
| Received mails from the boss | 0 |
| Sent mails to the boss | 0 |
| Received mails last week | 0 |
| Sent mails last week | 0 |
| Business news | 0 |
| Genre – Disco | 0 |
| Other sent mail | 0 |
| Other received mail | 0 |
| Sent mails to the wife | 0 |
| IP Law news | 0 |
| Received mails today | 0 |
| Sent mails today | 0 |
| Financial news | 0 |
| Received mails from the wife | 0 |

*FIG. 13*

SYSTEM AND METHOD FOR INCREASING DATA AVAILABILITY ON A MOBILE DEVICE BASED ON OPERATING MODE

CROSS-REFERENCE TO RELATED ASSETS

This application is a continuation of U.S. patent application Ser. No. 11/754,757, entitled "System and Method for Increasing Data Availability on a Mobile Device Based on Operating Mode, filed May 29, 2007, the entire disclosure of which is hereby incorporated by reference in its entirety.

FIELD OF THE INVENTION

The present invention relates to a system for ensuring user data availability probability on a mobile device, wherein the mobile device may have a storage capacity less than the size of the data and data services.

BACKGROUND

With digital media and other data usage growing, the amount of memory required for storage is increasing. A good example of this is media related items, such as songs and videos. These items are often stored and accessed by a user on a mobile device for "on-the-go" access. Even with compression technologies, a user's media library can easily be in the tens of gigabytes. Media collections will only become larger over time as video and other data services become more prevalent. In this regard, software applications, such as Apple® iTunes® for example, have been created to store and manage the user's media library. These software applications are typically executed on the user's personal computer or a server under the user's account, wherein the user's entire media collection is stored persistently on an associated hard drive, either resident on the computer or server's internal data bus or provided via a networked hard drive (e.g. a NAS device).

The user executes the media software application to download the desired media items from their media library to their mobile device. An example of such a portable mobile device is the Apple® iPOD® media player. Because users expect their mobile devices to be adapted to store all or a significant portion of their media collection for mobile usage, media players, including the Apple® iPOD®, provide gigabytes of memory storage. Some models are presently adapted to store as much as 30 gigabytes of data. However, because of the size and packaging restraints of mobile devices, per unit memory costs are higher than those associated with a typical hard drive, thereby adding significant costs to mobile devices. Further, as users' typical data collection needs increase in size, manufacturers of mobile devices are under marketing pressure to increase the memory capacity of the mobile device, thus continuing to increase costs. Even with advanced memory technologies, which promise ever increasing memory storage capacity, users' demand for "on the go" data will always outstrip the memory capacity that is economically feasible to install on mobile devices.

To address this problem, mobile devices can be provided with remote communication capabilities to remotely access the user's data via the mobile device. However, data latency issues exist with this scheme. Further, if the network is not accessible, such as the mobile device being located outside a wireless network coverage area, the user would not be able to access their data.

Consequently, memory management schemes and methods for mobile devices is and will continue to become important, especially as the typical size of the user's data collections increase and overtake memory capacities of mobile devices. It will be important for a user to not only be able to access any of their user data collection on a mobile device with minimum latency issues, but also to perceive the complete contents of their data collection. Without this perception, the user may not be aware that certain data not resident on the mobile device is available from their data collection for access and/or usage.

SUMMARY

Provided is a system to allow a user access to a data collection, including but not limited to their own data collection, from a mobile device, without requiring either persistent storage of the complete data collection locally on the mobile device, or network access requests for each user data request from the mobile device. In an embodiment, the system employs a data probability function to predict the probability of the mobile device accessing specific types of user data, data services, or application data from their data collection based on the operating mode of the mobile device. The system in an embodiment executes as a background process to update locally in cache memory on the mobile device, the data most probable to be accessed by the user based on the user activity profile. In this manner, since there is a higher probability the data stored locally in the mobile device is data that will be accessed by the user, the mobile device does not have to include data storage capacities necessary to store the entire data collection and/or data services. Further, because the data most likely to be accessed via the mobile device is made available locally, latency issues that occur during frequent remote data accesses are minimized.

The operating mode used to execute the data probability function may be based on several types of data or analysis that may affect data services likely to be requested by the user. For example, the operating mode may be based on intrinsic device-specific information regarding the mobile device, such as time and date and/or the location of the mobile device (derived from GPS or similar sources). The operating mode may be based on user activities, such as the user manually selecting an operating mode desired, or user preference settings at the mobile device that may change the operating mode automatically. The operating mode may also be based on data service usage patterns associated with particular data requests by the user at the mobile device, including but not limited to data cache misses. A data cache miss indicates to the data aggregator that the data service requested by the user is not currently stored in the data cache of the mobile device.

In an embodiment, the system for increasing availability of a data collection includes a hardware server and a mobile device. The hardware server comprises a communication network interface and a data aggregator associated with the communication network interface. The data aggregator is adapted to accept a communication session with a mobile device, receive an operating mode message comprising operating mode information for the mobile device, determine a subset of data among the data collection that is likely to be accessed at the mobile device based on the operating mode information, and send the subset of data to the mobile device. The mobile device includes a data cache for storing the subset of data from a data collection, a communication interface adapted to establish communication with the data aggregator having access to the data collection, and a control system. The control system is adapted to determine an operating mode of the mobile device, send the operating mode message including the operating mode information of the mobile device to the data aggregator, receive the subset of data from the data aggregator that is likely to be accessed at the mobile device based on the operating mode information of the mobile device, and store the subset of data in the data cache.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 10 is a first exemplary data-specific (calendar data) weighting assignment to allow the data probability management system and method to manage data availability based on the operating mode of the mobile device according to one embodiment of the present invention;

FIG. 11 is a third exemplary data-specific (song data) weighting assignment to allow the data probability management system and method to manage data availability based on the operating mode of the mobile device according to one embodiment of the present invention;

FIG. 12 is an exemplary resultant data probability assignment for the "productivity" operating mode provided by the data probability management system and method to manage data availability to the mobile device;

FIG. 13 is a second exemplary resultant data probability assignment for the "entertainment" operating mode provided by the data probability management system and method to manage data availability to the mobile device;

Figure 14:
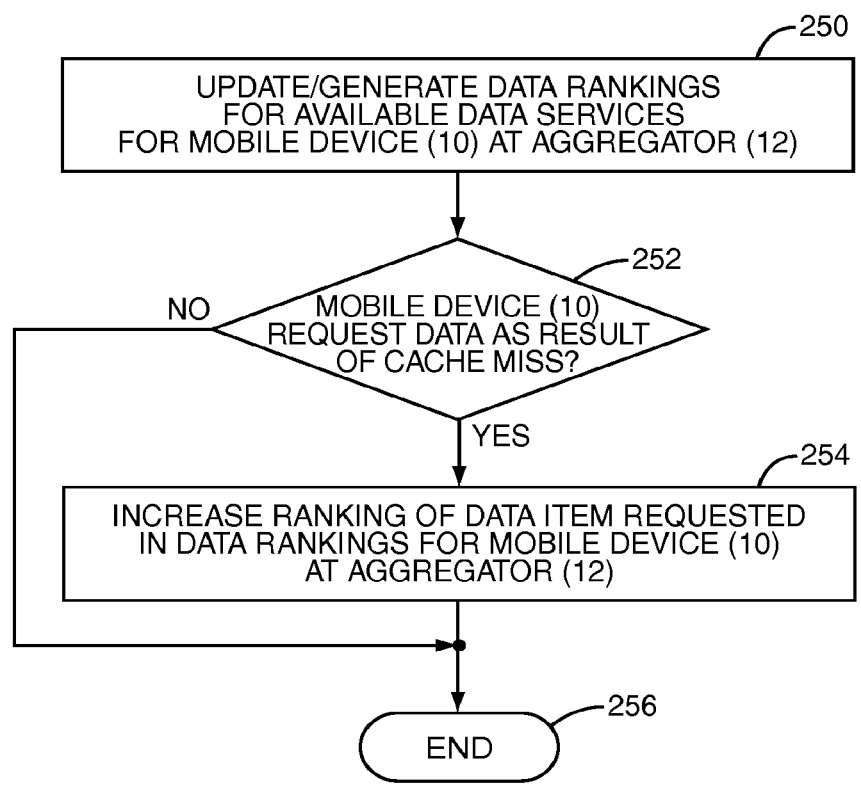
Figure 15:
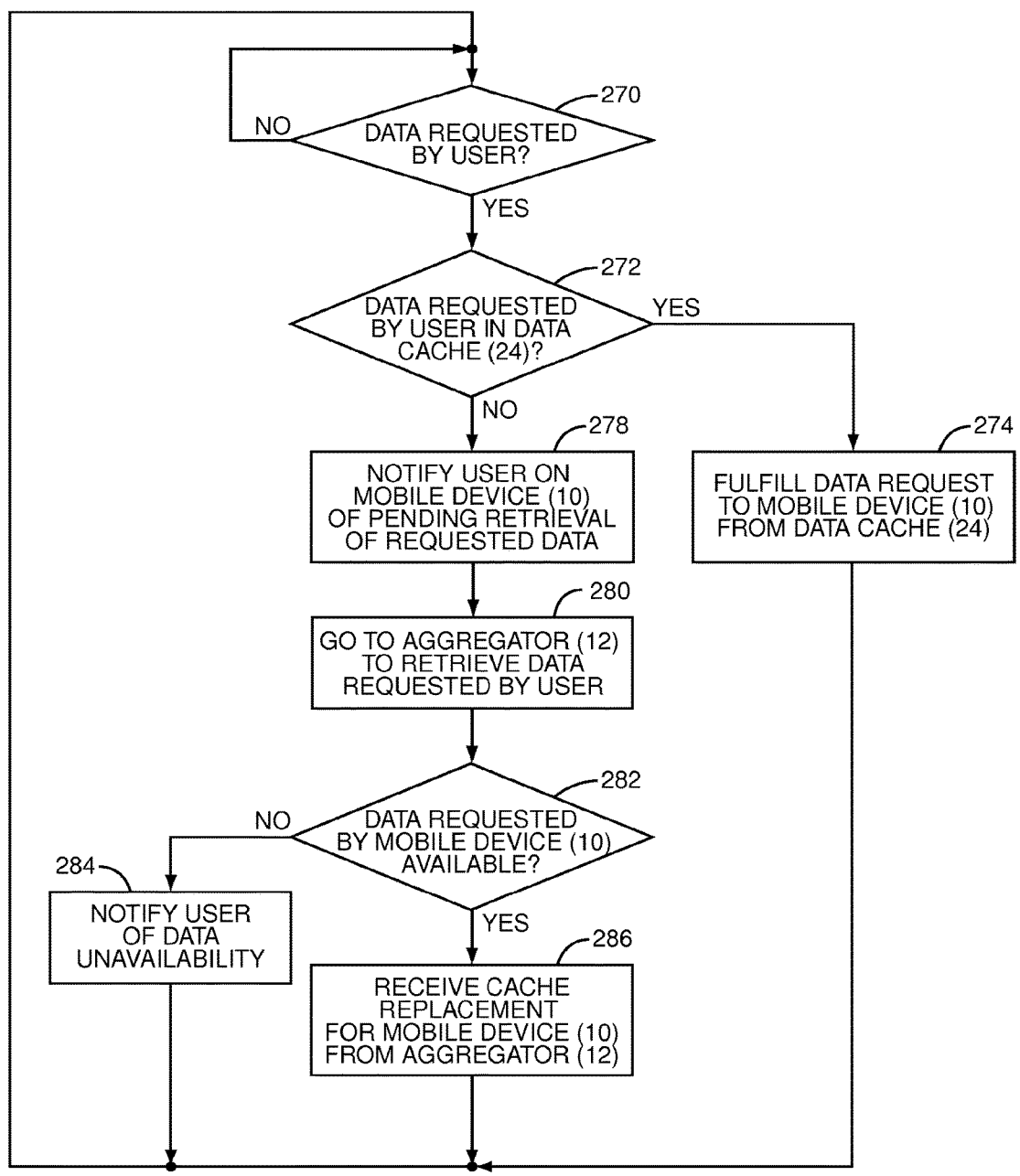

FIG. 14 is a flowchart illustrating an exemplary mobile device "smart cache operation" process for the data probability management system and method for the mobile device according to one embodiment of the present invention; and FIG. 15 is a flowchart illustrating an exemplary mobile device "data request" process for the data probability management system and method for the mobile device according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Described is a system to allow a user access to a data collection, including but not limited to their own data collection, from a mobile device, without requiring either persistent storage of the complete data collection locally on the mobile device, or network access requests for each user data request from the mobile device. The system can employ a data probability function to predict the probability of the mobile device accessing specific types of data, data services, or data applications from their data collection based on the operating mode of the mobile device. The operating mode may be based on any data or analysis that is deemed to provide an indication of the data services more likely to be requested by a user at the mobile device. The system can be executed as a background process to update locally in cache memory on the mobile device, the data most probable to be accessed by the user based on the user activity profile. In this manner, since there is a higher probability the data stored locally in the mobile device is data that will be accessed by the user, the mobile device does not have to include data storage capacities necessary to store the entire data collection and/or data services. Further, because the data most likely to be accessed via the mobile device is made available locally, latency issues that occur during frequent remote data accesses are minimized.

The operating mode used to execute the data probability function may be based on several types of data or analysis that may affect data services likely to be requested by the user. For example, the operating mode may be based on intrinsic device-specific information regarding the mobile device, such as time and date and/or the location of the mobile device (derived from GPS or similar sources). The operating mode may be based on user activities, such as the user manually selecting an operating mode desired, or user preference settings at the mobile device that may change the operating mode automatically. The operating mode may also be based on data service usage patterns associated with particular data requests by the user at the mobile device, including but not limited to data cache misses. A data cache miss indicates to the data aggregator that the data service requested by the user is not currently stored in the data cache of the mobile device.

In one embodiment, the mobile device contains a device application that manages the operation of the mobile device, including maintaining the device operating mode. The mobile device may also contain one or more data application proxies that represent data from data services on a host system to the device user, and intercept user requests for this data, communicating with the host system via an interface provided in the mobile device. The host system has access to the data collection and/or data services, which may include the user's data collection or data services. In the background, when the operating mode on the mobile device changes, the mobile device communicates the operating mode to a data aggregator at the host system. The data aggregator in turn executes a data probability function that determines the subset of the data collection most likely to be requested by the mobile device based on the operating mode. The data aggregator accesses this subset of data from the data collection and downloads the data to the data application proxy, which in turns updates cache memory in the mobile device. This process is typically transparent to the user of the mobile device.

Thus, when the user requests data on the mobile device, the data application proxy first attempts to retrieve the requested data from cache memory on the mobile device. Because of the data probability management system and method, the cache memory has a higher probability of containing the data requested by the user on the mobile device. If the data requested is not present in cache memory, a "cache miss" is reported to the data aggregator at the host system. In turn, the data aggregator may simply retrieve the requested data and provide it to the mobile device over the network to fulfill the data request without replacing the cache memory. This action is performed if the "cache miss" does not change the operating mode of the mobile device, by changing the probability that the user data stored in cache memory is still the most probable data to be accessed by the user, such as a result of a single "cache miss" for example. Alternatively, the data aggregator may signal that a cache memory replacement is required in response to a "cache miss" if the data probability function indicates that data not currently stored in cache memory of the mobile device is most probable to be subsequently accessed by a user, such as a result of multiple "cache misses" for example, which may signal a pending change in user activity profile.

Figure 1:
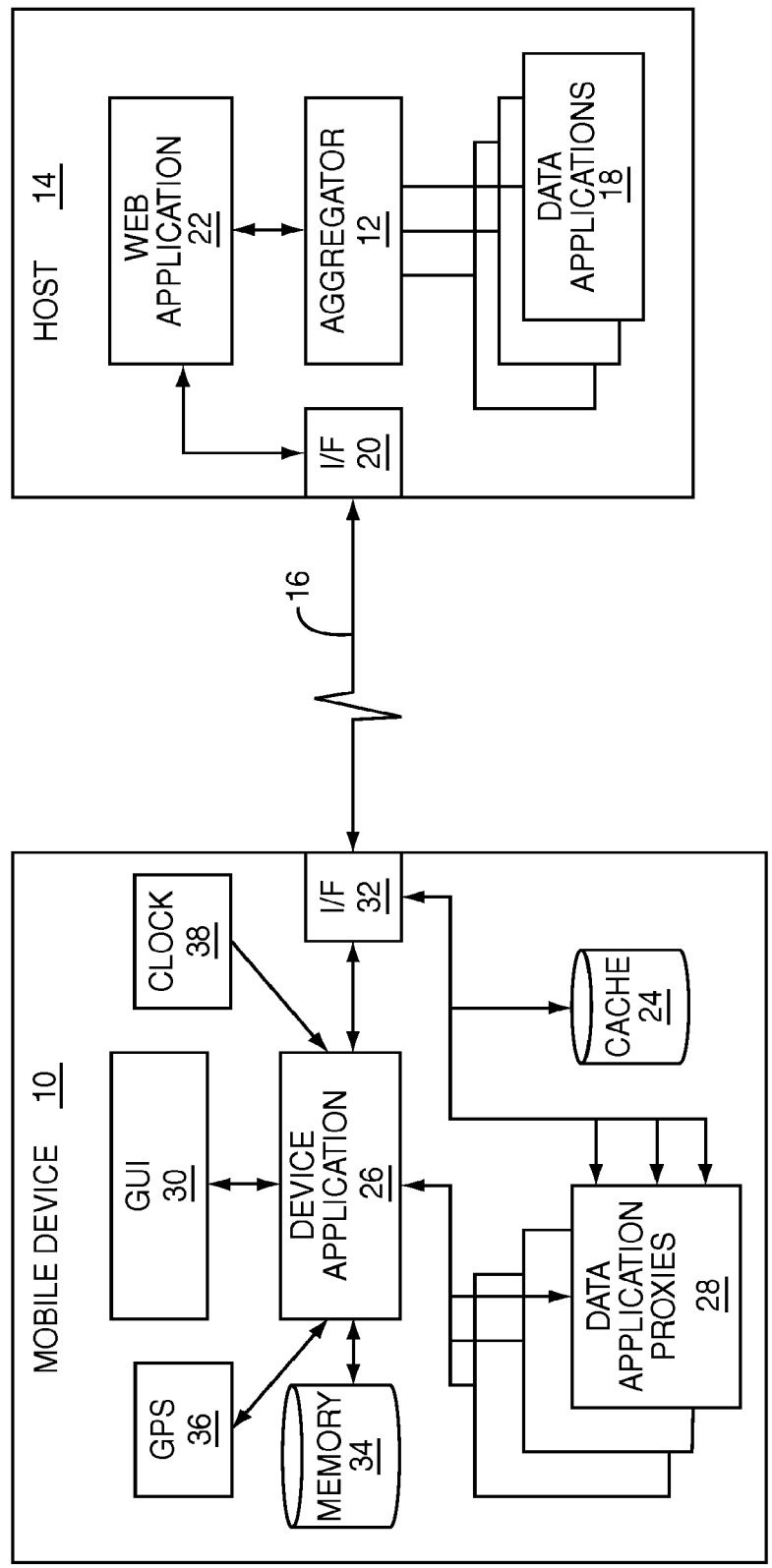
FIG. 1 illustrates a data management architecture for a mobile device according to one embodiment of the present invention.

In this regard, FIG. 1 illustrates a data management architecture that may be employed in a mobile device according to one embodiment of the present invention. The data management architecture will be explained first herein before discussing the particular details regarding the data probability function. As illustrated in FIG. 1, a mobile device 10 is provided. The mobile device 10 may be any type of mobile device, including but not limited to a cellular phone, a personal digital assistant (PDA), a Digital Audio Player (DAP), and a personal media player (PMP). The mobile device 10 is typically carried by a user to perform a variety of functions, such as, but not limited to, accessing email, calendar functions and related data, multimedia data and related applications, and other user specific data or services.

The mobile device 10 communicates with a data aggregator 12 residing at a host 14 over a communication network 16 to report the user's activity profile. The host 14 may be a server or any other computing system or device for example. The communication network 16 may be any type of communication network, including but not limited to cellular, universal serial bus (USB), and WiFi, as examples. The host 14 provides an interface 20 to the communication network 16 to receive and communicate data to and from the mobile device 10. The data aggregator 12, either via a direct connection to the interface 20, or via a host application 22 execution at the host 14, uses the received user activity profile from the mobile device 10 to perform the data probability function to decide which subset of the user data and/or services will be provided to the mobile device 10 for local access on the mobile device 10 by the user. The data aggregator 12 maintains a connection to a plurality of data applications 18 at the host 14 to access and provide the data collection and/or related applications to the mobile device 10 according to the data probability function. The data applications 18 may contain data, data services, and/or data applications.

The data collection may be a user's data collection, meaning associated with a user. Thus, the data applications 18 may be a user's data collection comprised of user data, user data services, and/or user data applications. Note that this application refers to the user's data or user's data collection herein for convenience, but it should be understood that such user data collection is contained within the broader scope and meaning of a data collection in general. Both types of data, a data collection and a user's data collection as one type of data collection associated with a user, are within the scope and spirit of this application.

The data applications 18 may also be any combination of existing data-driven applications, such as a calendar, email, multimedia, or other applications for example. These data applications 18 may be web or personal computer (PC) based. The user data provided by the data aggregator 12 may include digital rights management (DRM) protection, which may be facilitated by the data aggregator 12 so that the mobile device 10 does not require a special license for the user to access or consume. Through this technology at the host 14, the user will be able to access their user data collection and/or data services with limited connectivity, although the user's experience will be optimized when full-time and ubiquitous connectivity is available.

The mobile device 10 includes a data cache 24, which is adapted to hold a subset of the user's data collection and/or data services accessed, which is provided by the data aggregator 12 over the communication network 16 as a result of execution of the data probability function. The data aggregator 12 provides a subset of data from the user data collection and/or services to either fill or replace the data cache 24 when the data probability function is performed. The data cache 24 may be comprised of volatile memory, non-volatile memory, or may be a two-level cache with some of the data residing in volatile memory to increase speed of access to the cached data residing therein.

The mobile device 10 may also contain a device application 26 that executes to perform interaction directly with the user of the mobile device 10 and to handle the overall input and output functions of the mobile device 10, along with managing the operating mode. The device application 26 interacts with one or more data application proxies 28 that encapsulate and control access to the data stored in the data cache 24. In this manner and in the exemplary embodiment, neither the data cache 24 nor the data stored in the data cache 24 is accessed directly by the device application 26 or the data aggregator 12. The architecture resembles a memory bus cache in computer systems, wherein access to the data is encapsulated by the associated data application proxy 28 on the mobile device 10. All interaction with the data cache 24 to access data is performed via the data application proxies 28.

The mobile device 10 may also contain a graphical user interface (GUI) 30 that is used to provide data input and output between the user and the device application 26. The mobile device 10 also includes an interface 32 that allows the mobile device 10 to communicate over the communication network 16 to the data aggregator 12 to receive cache fill and replacement data when the data probability function is performed. The device application 26 may be connected to the interface 32 to send the operating mode to the data aggregator 12, and all interaction between the mobile device 10 and the data aggregator 12 may be directly between the data application proxies 28 and the data aggregator 12 depending on design. The data cache 24 fill and/or replacement operation performed by the data aggregator 12 may occur in the "background" automatically without the device application 26 having to be involved or knowing of same. In this manner, data exchanges will be transparent to the user of the mobile device 10.

The mobile device 10 may contain memory 34 that is dedicated to the device application 26 for use in controlling the operation of the mobile device 10. This memory 34 may store information such as the location of the mobile device 10, via interaction with an on-board global positioning system (GPS) 36, time and date information that is provided by an on-board clock 38 or a network clock via communications over the communication network, as examples. Other information about the mobile device 10, such as an operating mode, may also be stored in memory 34 so that the device application 26 can access this data to control the operation of the mobile device 10.

Figure 2:
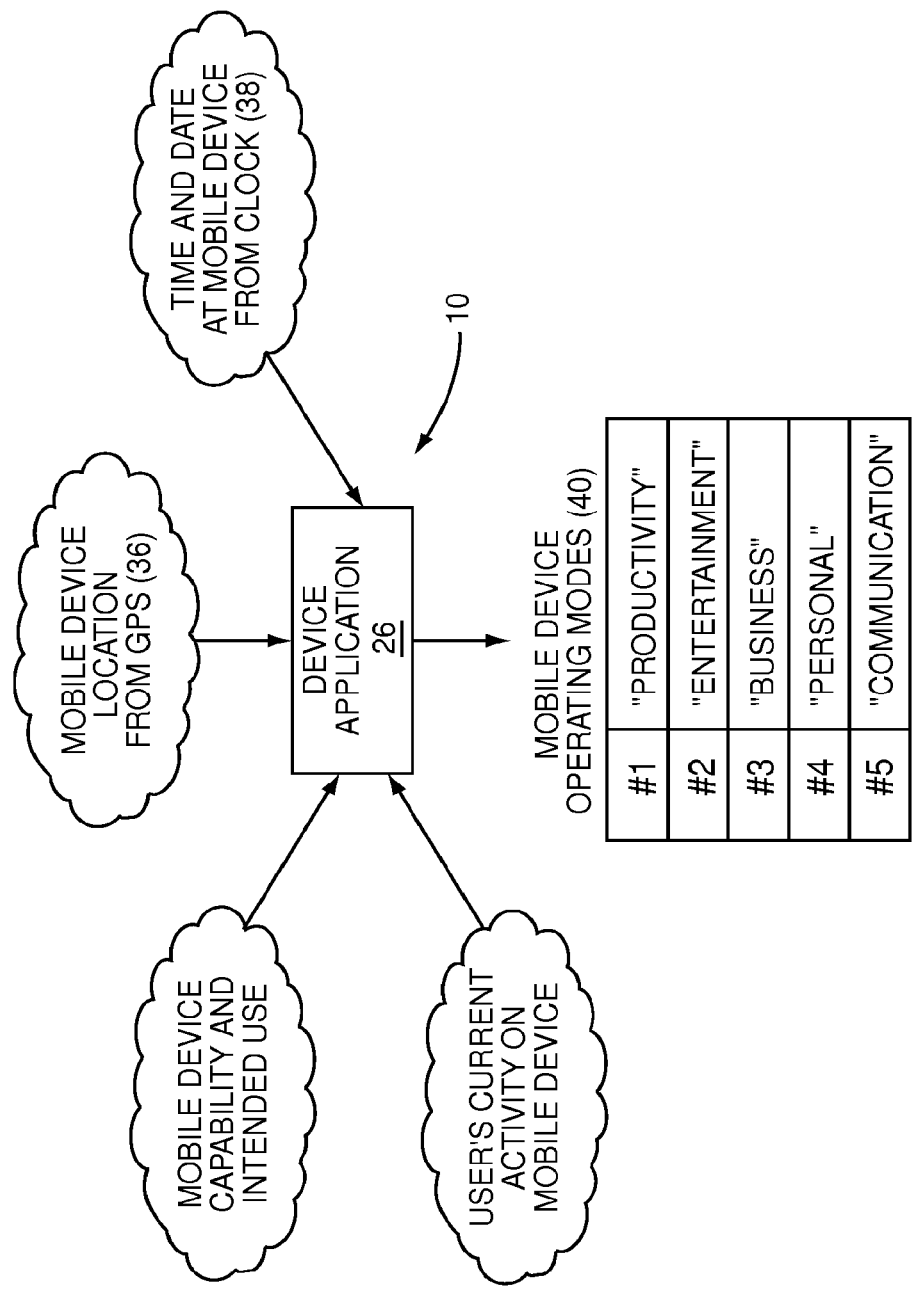
FIG. 2 is a representation of the operating mode criteria used by a mobile device to perform a data probability management system and method according to an example of the present invention.

FIG. 2 illustrates an example of data that may go to determining the operating mode of the mobile device 10. As discussed above, the present invention involves using an operating mode of the mobile device 10 to perform the data probability management system and method to fill and/or replace the data cache 24 in the mobile device 10 with data more likely to be requested by the user. The operating mode may be based on any data or analysis that provides information about the user's actual or anticipated use and thus determines the data that is or is likely to be subsequently accessed. In the illustrated example, the mobile device 10 has five different possible operating modes (40). These are the "productivity," "entertainment," "business," "personal," and "communication" operating modes. One of the operating modes 40 is determined for the mobile device 10, which is then used by the data aggregator 12 to determine which subset of the user data or data services is most likely to be accessed by the user at the mobile device 10. For example, if the mobile device 10 is in the "entertainment" operating mode, the user may be more likely to access digital media, including songs and videos. If the mobile device 10 is in the "business" mode, the user may be more likely to access a work calendar and work email. The "communication" operating mode would be provided if the user is performing calls using the mobile device 10. The operating modes 40 are usually programmed based on disparate data types that may be accessed by the user, so that only a subset of data necessary to perform under such modes can be provided with a lower probability of data request misses from the data cache 24. Some user data or services may be exclusively assigned to only one operating mode. Alternatively, user data and services may be assigned such that it can be provided in multiple operating modes of the mobile device 10. An example would be calendar data, which may be assigned for possible inclusion in the data cache 24 for the "business," "personal," and "productivity" operating modes.

The operating mode 40 of the mobile device 10 may be controlled by a variety of factors and other data. In the example of FIG. 1, the operating mode 40 is controlled as a function of intrinsic mobile device 10 characteristics, such as the time and/or date at the mobile device 10, the location of the mobile device 10, and the mobile device's 10 capabilities and determined intended uses. For example, if the mobile device 10 is located away from the user's home area and the time is during business hours, the mobile device 10 may go into the "business" operating mode.

The operating mode 40 may also be based on the user's current activity on the mobile device 10. The mobile device 10 may be adapted to allow the user to change the operating mode 40 manually, or the mobile device 10 may change operating mode based on the user's interaction with the mobile device 10 or the user's preference settings for the mobile device 10. For example, the user may have configured the mobile device 10 to automatically switch from the "productivity" operating mode to the "entertainment" operating mode after 6:00 p.m. during weekdays, signifying the end of a work day. However, if the user subsequently requests access to business related digital media data, the mobile device 10 may transition back into the "business" operating mode.

The operating mode information is communicated via a message, which may be referred to as an operating mode message, or other indicator to the data aggregator 12 upon the occurrence of certain events to perform the data probability function to determine if the data cache 24 should be replaced with other data that the user is more likely to access based on their activity. In this manner, the subset of data requested by the user on the mobile device 10 is more likely to be present in the data cache 24 without having to be obtained over the communication network 16 at slower speeds and subject to the availability of the communication network 16 and the host 14. In the same regard, memory storage capacities provided on the mobile device 10 may be reduced with an acceptable degree of probability of data requests being fulfilled locally from the data cache 24, allowing mobile device manufacturers to develop lower-cost devices. The mobile device 10 may be programmed to collect and provide the specific type of user activity profile data by design. The data aggregator 12 may be programmed to use such designed user activity profile data to perform the data probability management function. This programming may be provided by a system designer of the data aggregator 12, by a carrier, or a data application providers. For example, the data aggregator 12 may be adapted with a new module that performs the data probability function using a different algorithm or probability determination, such as by a cellular carrier who desires to differentiate their data aggregation service compared to their competitors. Additionally, data application providers may provide probability determination modules specific to their data application, to allow them to differentiate from their competitors. Data application providers may be in the best position to distinguish between different probabilities of user access to their provided data. The modules may be in the form of a plug-in module downloaded to the data aggregator 12.

It should be noted that the operating mode 40 may also be based on an analysis performed by the data aggregator 12 in response to sensing the types of data services requested by the user. The data aggregator 12 may be programmed in particular to be sensitive to operating mode changes based on cache misses, meaning the requested data by the user was not found in the data cache 24. In this manner, if the operating mode of the mobile device 10 continues to generate cache misses to the data aggregator 12, the data aggregator 12 would have the ability to take corrective action to change the operating mode for the mobile device 10 used for performing the data probability function to minimize the possibility of subsequent data cache 24 misses.

Figure 3:
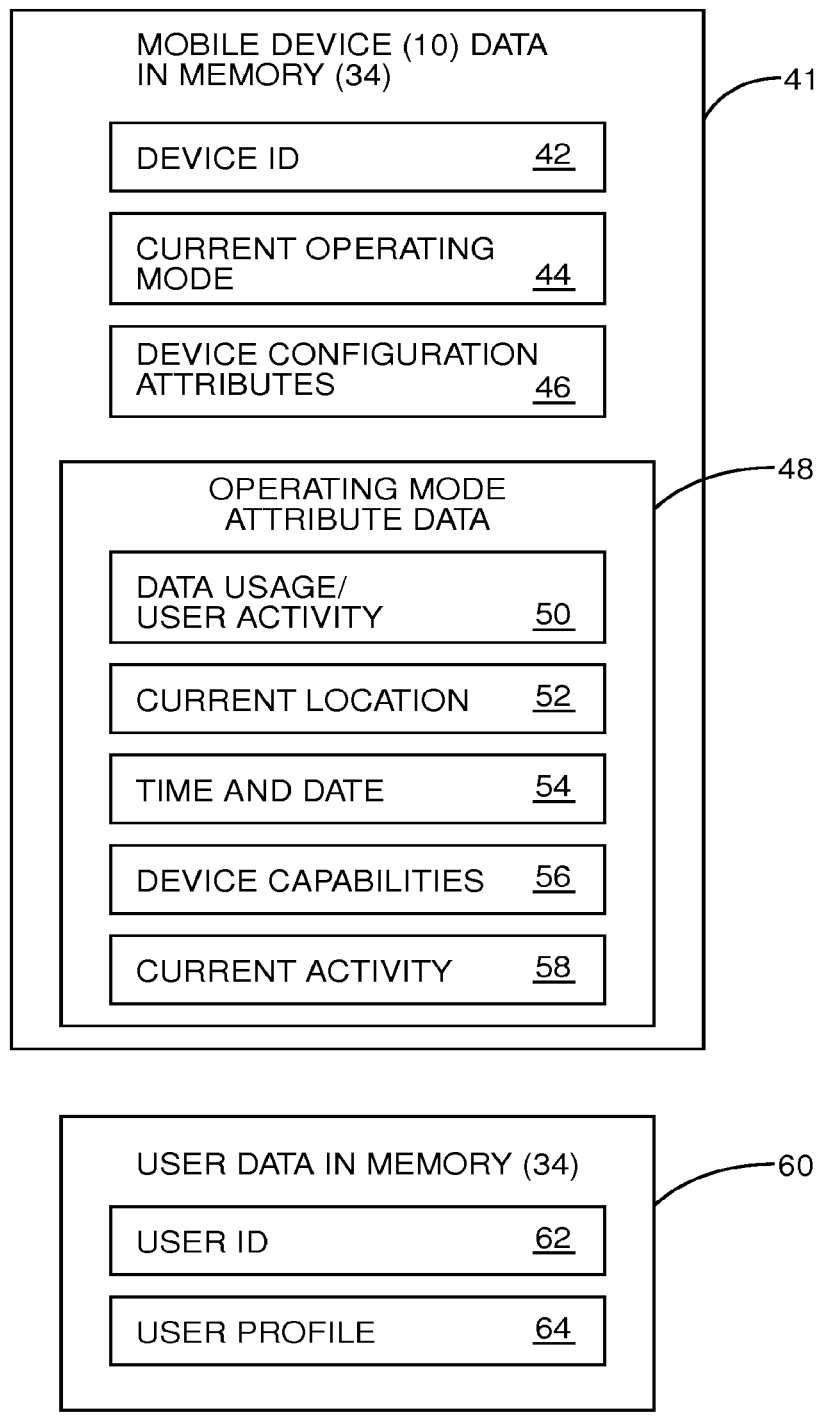
FIG. 3 illustrates exemplary data structures in the mobile device to store the operating mode and other data used to support the data probability management system and method for the mobile device.

FIG. 3 illustrates an exemplary data structure 41 for storing mobile device information in memory 34 that may be used to control the operating mode of the mobile device 10 so that the data aggregator 12 can perform the data probability management function. As illustrated, the mobile device memory 34 may include a device id 42 so that communications to the data aggregator 12 can be uniquely identified and associated with a particular mobile device 10. This information may be necessary to access the correct user data and/or data services as well as returning communications back to the mobile device 10. For example, if one form of the communication network 16 is not available, for example a WiFi network, the data aggregator 12 may use the mobile device id 42 to provide updated data for the data cache 24 via an alternative communication network, for example cellular communications. In this example, the device id 42 may include an electronic serial number (ESN) to facilitate primary or back-up cellular communications to the mobile device 10.

A current operating mode 44 of the mobile device 10 is stored in memory 34. As discussed above, the device application 26 executes routines based on data received from the user and other devices associated with the mobile device 10 to set the operating mode. The operating mode is communicated to the data aggregator 12 to perform the data probability management function. Mobile device configuration attributes 46 may also be stored in memory 34. This data contains configuration information for the mobile device 10 to control the operation and is commonly found in most mobile devices 10, especially if they contain remote communication capabilities.

Operating mode attribute data 48 may also be provided and stored in memory 34 to control the current operating mode 44. The operating mode attribute data 48 is a collection of the individual data that is used to control the operating mode 40 of the mobile device 10. In this exemplary embodiment and as illustrated in FIG. 2, the operating mode 40 of the mobile device 10 may be controlled by the data usage or user activity at the mobile device 10, which may be stored in a data usage/user activity data field 50. The current location and time of the mobile device 10 may be stored in a current location field 52 and a time field 54, respectively. The device capabilities and the user's current activity may be stored in a device capabilities field 56 and a current activity field 60, respectively. In this manner, the device application 26 can update information in the operating mode attribute data 48 fields as this information changes, and then another function within the device application 26 periodically checks this information to determine if an operating mode change should be performed at the mobile device 10. As will be discussed later in this application, an operating mode change initiates a communication to the data aggregator 12 to perform the data probability management function and to provide a data cache 24 replacement, if necessary.

Other data about the user may be stored in memory 34 in a user data section 60. This data may include the user id 62 and a user profile 64. The user id 62 may be a nickname or id that is communicated to the data aggregator 12 to access certain services. For example, the user id 62 may be used to obtain the user's email. The user profile 64 may contain preferences or other profile information used by the device application that can also affect the operating mode 40 of the mobile device 10. An example of user profile 64 information may include GUI 30 settings, ring styles, font sizes, etc.

Figure 4:
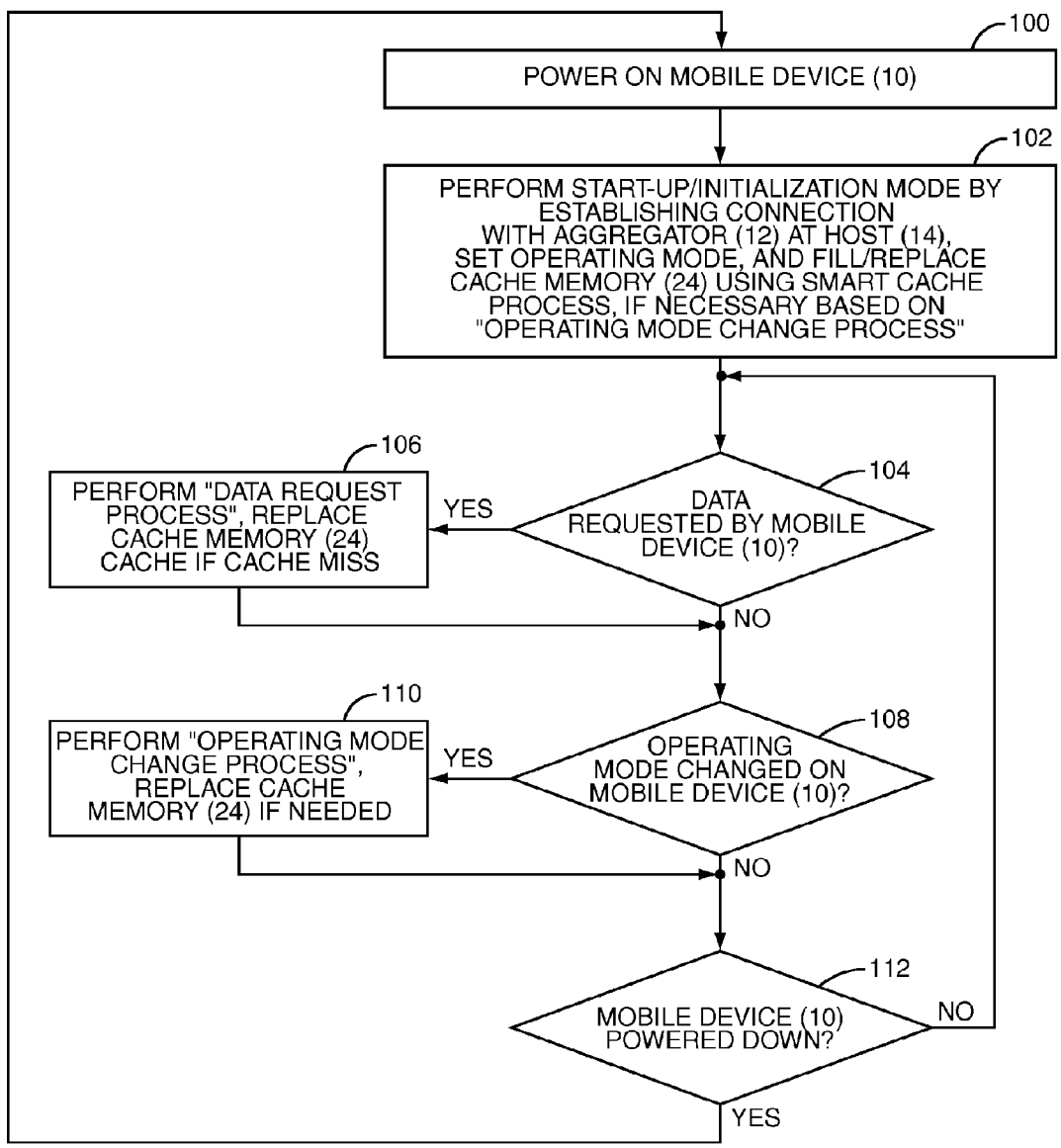
FIG. 4 is a flowchart illustrating an exemplary overall process of the data probability management system and method for the mobile device.

Against the backdrop described above for an exemplary system architecture and data that may be used to control the operating mode 40 of the mobile device 10, FIG. 4 illustrates the overall process of the data probability management function according to one embodiment of the present invention. In this embodiment, the operating mode of the mobile device 10 is provided to the data aggregator 12, which in turn determines and provides data to be stored in the data cache 24 of the mobile device 10. The process starts when the mobile device 10 is powered on (step 100). Thereafter, the mobile device 10 performs a "start-up/initialization process" by establishing a connection with the data aggregator 12 at the host 14 (step 102). The operating mode 40 is established and communicated to the data aggregator 12 (step 102). The data aggregator 12 performs a "smart cache process" to determine and provide to the mobile device 10, the subset of user data and/or data services to increase the probability that subsequent user data requests can be fulfilled by the data cache 24 as opposed to network access to minimize latency issues (step 102). The data may be downloaded or streamed in real time by the data aggregator 12 to the mobile device 10, such as over an Internet communication network, or progressively downloaded or streamed to the mobile device 10 as part of a background process.

Thereafter, the device application 26 operates to receive input and requests from the user for access to data and/or associated applications. Once received (decision 104), the mobile device 10 performs a "data request process" to retrieve and provide the requested data to the user at the mobile device 10 (step 106). The data cache 24 is consulted to obtain the requested data. At this point, the data cache 24 has already been previously updated with the subset of user data anticipated to be accessed by the data aggregator 12 based on the user activity profile. Thus, there is a high probability that the requested data will be present in the data cache 24. However, in the event that data requested is not present in the data cache 24, such as the user requesting data outside the expectations of the mobile device's 10 operation mode, a "cache miss" will be generated. The mobile device 10 will report the cache miss to the data aggregator 12, which will in turn provide the requested data. Depending on the nature of the cache miss and the user activity profile (which is also communicated as part of the cache miss so that the data aggregator 12 has the most up to date information regarding the mobile device 10), the data aggregator 12 may perform the data probability function and provide replacement data for the data cache 24.

If data has not been requested by the user in decision 104, the process determines if an operation mode change has occurred on the mobile device 10 (decision 108). If so, this may signify the need to replace data in the data cache 24, since the user may be more likely to subsequently request access to data that is not present in the data cache 24. In response, an "operation mode change process" is performed to replace the data in the data cache 24 of the mobile device 10 as needed depending on the outcome of the data probability function performed by the data aggregator 12 (step 110). As previously discussed above, while not absolutely required, the system is programmed to provide different operating modes 40 based on disparate data types. Thus, an operating mode change is likely to involve access to data that is not currently stored in the data cache 24, although this may not necessarily be true all the time and in all cases. However, the data aggregator 12 and its data probability function makes this decision regarding the data cache 24.

If in decision 108, a mobile device 10 operating mode change did not occur, the process continues to repeat in a looping fashion by returning back to decision 104 to execute on any subsequent data requests by the user or operating mode changes to the mobile device 10, until the device is powered down (decision 112), in which case the process will return back to step 100 when the mobile device 10 is powered on again.

Figure 5:
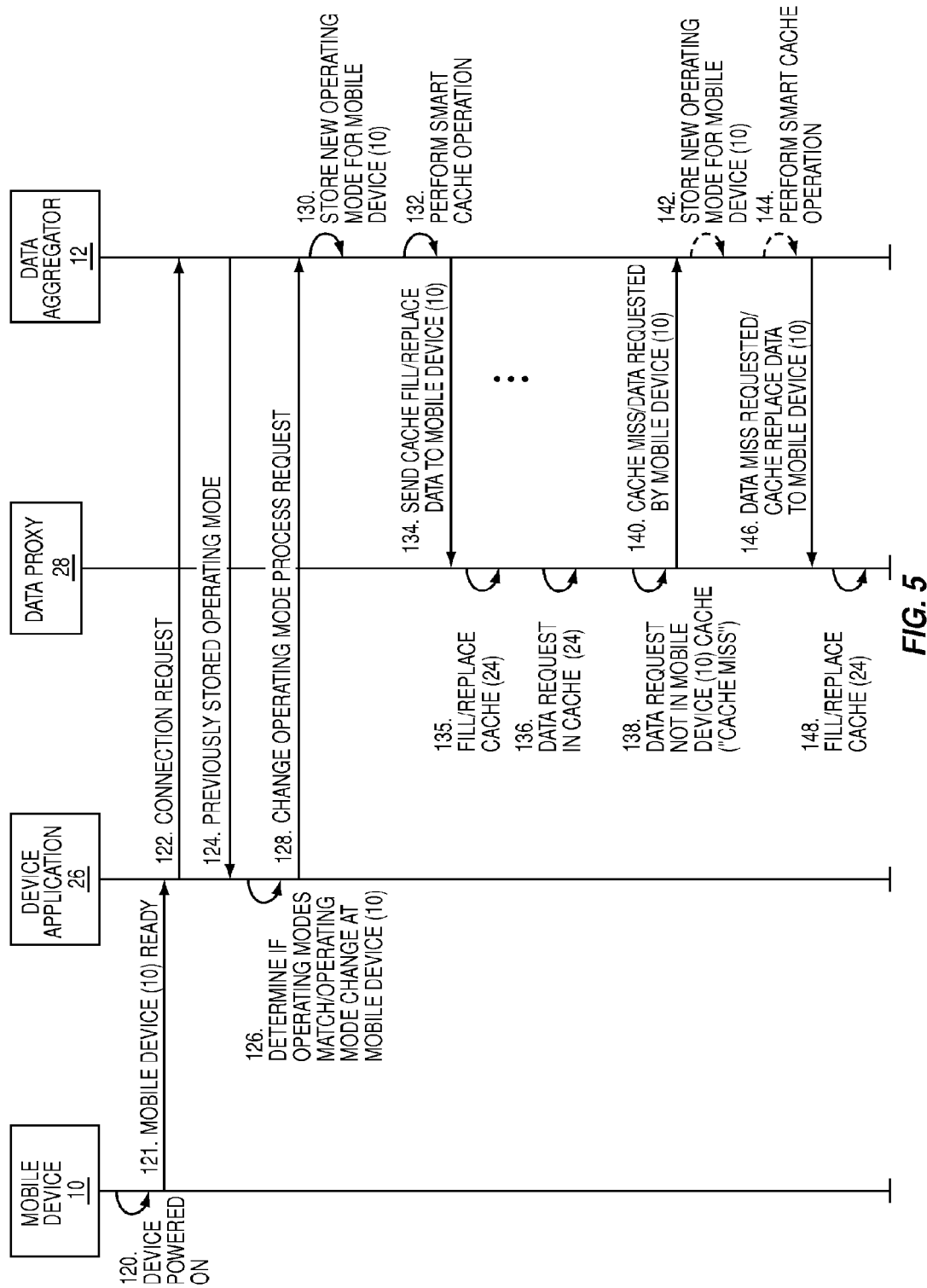
FIG. 5 is an exemplary communication flow diagram between mobile device, its memory management components, and a remote data aggregator for performing the data probability management system and method for the mobile device according to one embodiment of the present invention.

FIG. 5 illustrates an exemplary communication flow diagram between the device application 26, the data application proxy 28, and the data aggregator 12 to provide the data probability management system and process according to the main embodiment of the present invention. The communication flow diagram in FIG. 5 supplements and further illustrates the process illustrated in the flow chart of FIG. 4. In FIG. 5, the interaction between the various components of the system architecture illustrated in FIG. 1 can more readily be seen and understood. The communication flows and processes performed in the communication flow diagram of FIG. 5 are consistent with the overall process and operations illustrated and discussed above for FIG. 4.

Turning to FIG. 5, the mobile device 10 is powered on (step 120). Next, the mobile device 10 indicates to the device application 26 that the mobile device 10 is ready (step 121). This in turn causes the device application 26 to make a connection request, which includes the device id 42, to the data aggregator 12 during a startup/initialization process (step 122). The data aggregator 12 returns the previously stored operating mode 40 for the mobile device 10 to the device application 26 (step 124). This is so that it can be determined if the operating mode 40 has changed since the mobile device 10 last established communications with the data aggregator 12. The data in the data cache 24 of the mobile device 10 at this time is based on the last operating mode 40 of the mobile device 10 known to the data aggregator 12. Thus, if the operating mode 40 has since changed, the data in the data cache 24 may not be optimized for the anticipated data requests by the user at the mobile device 10.

The device application 26 determines if the operating mode 40 of the mobile device 10 has changed by comparing the operating mode stored at the data aggregator 12 with that of the operating mode stored in the current operating mode field 44 (step 126). If so, or if the mobile device 10 is being initialized with the data aggregator 12 for the first time, a change operating mode process request is communicated to the aggregator 12 (step 128). This is so that the data aggregator 12 is notified of the current mobile device 10 operating mode 40 and can execute the data probability function to determine if the data cache 24 should be updated or replaced with a different subset of user data. The data aggregator 12 stores the new operating mode 40 for the mobile device 10 (step 130), and performs the "smart cache operation" to perform the data probability function based on the received operating mode (step 132). The data aggregator 12 then sends a data cache fill (if the mobile device 10 is being initialized for the first time) or replacement to the mobile device 10 (step 134). If the data cache 24 is to be filled or replaced, the data proxy 28 facilitates this operation via communications resulting from the data aggregator 12 over the communication network 16 (step 135).

If in the future, the user makes data requests of the mobile device 10, the mobile device 10, via the data proxy 28, will access the data cache 24 to determine if the data exists locally (step 136). If not, the request is registered as a "cache miss" (step 138). The cache miss is then reported to the data aggregator 12 along with the operating mode 40 so that the data aggregator 12 is made aware of any operating mode change at the mobile device 10 (step 140). The data aggregator 12 then stores the new operating mode for the mobile device, according to its device id 42 (step 142), and performs the "smart cache process" to perform the data probability management function (step 144). Any resulting cache replacement or refill is then communicated back to the mobile device 10 (step 146), wherein the data cache 24 is updated (step 148).

In summary, because of the data probability data management system and method of the present invention, the data cache 24 has a higher probability of containing the data requested by the user on the mobile device 10. The data management system and method executes as a background process to update locally on the mobile device 10. In this manner, the data most likely to be accessed via the mobile device 10 is available locally, thereby minimizing latency issues that occur when network requests are performed to access the requested data. If the data requested is not present in data cache 24, a "cache miss" is reported to the data aggregator 12. In turn, the data aggregator 12 may simply retrieve the requested data and provide it to the mobile device 10 to fulfill the data request without replacing the cache memory. This action is performed if the "cache miss" does not change the probability that the user data stored in data cache 24 is still the most probable data to be accessed by the user, such as a result of a single "cache miss" for example, which may not signify that a change is needed for the operating mode 40 of the mobile device 10. Alternatively, the data aggregator 12 may perform a data cache 24 memory replacement in response to a "cache miss" if the data probability function indicates that data not currently stored in data cache 24 is more probable to be subsequently accessed by a user, such as a result of multiple "cache misses" for example, which may signify that a change is needed for the operating mode 40 of the mobile device 10. The later case is what is illustrated in the communication flow diagram example of FIG. 5.

The data aggregator 12 may also be programmed so that the data probability function executes automatically based on a previous operating mode of the mobile device in case the previous data cache 24 fill was temporary. The mobile device 10 may send a message to the data aggregator 12 for a temporary operating mode change as opposed to a permanent operating mode change. In this instance, the data aggregator 12 performs the data probability function based on the new temporary operating mode, and sends a data cache 24 replacement just as discussed. However, since the operating mode change is temporary, the data aggregator 12 can be configured to automatically revert back to the subset of data for the data cache 24, either by storage or executing the data probability function again, based on the previous operating mode, such as after a timeout or expiration of time. In this manner, the mobile device 10 is automatically updated with the reversionary user data and/or data services in data cache 24 without having to send another message to the data aggregator 12.

The present invention also includes the ability of the mobile device 10 to have complete perception of all user data and/or data applications available to the user via the mobile device 10 even if the underlying data is not stored in the data cache 24. The data aggregator 12 may send a user perceptible form of the user's data collection to the mobile device 10 to be stored in the data cache 24 and/or as part of a fill or replacement. This is so that the user can have perception of all data available in the user's data collection, at the mobile device 10 regardless of whether the represented data actually exists in the data cache 24. Otherwise, the user may not know that certain data exists such that when requested, a cache miss to the data cache 24 would be generated resulting in communication of the cache miss to the data aggregator 12. In this regard, a portion of the data cache 24 may be reserved for storage of identifying data (e.g. metadata) regarding the user's data collection and/or data services without storing the actual data identified. The data aggregator 12 may provide this information along with any data cache 24 fill or replacement. For example, for the song "Funk Soul Brother" by Fatboy Slim, the name of this song or other identifying metadata may be stored in the data cache 24 so that this song option is presented to the user for selection on the mobile device 10. However, the actual song may not be present in the data cache 24. Instead, the song data is stored or accessible by the data aggregator 12, and may be provided as a result of a "cache miss" by the mobile device 10.

Figure 6:
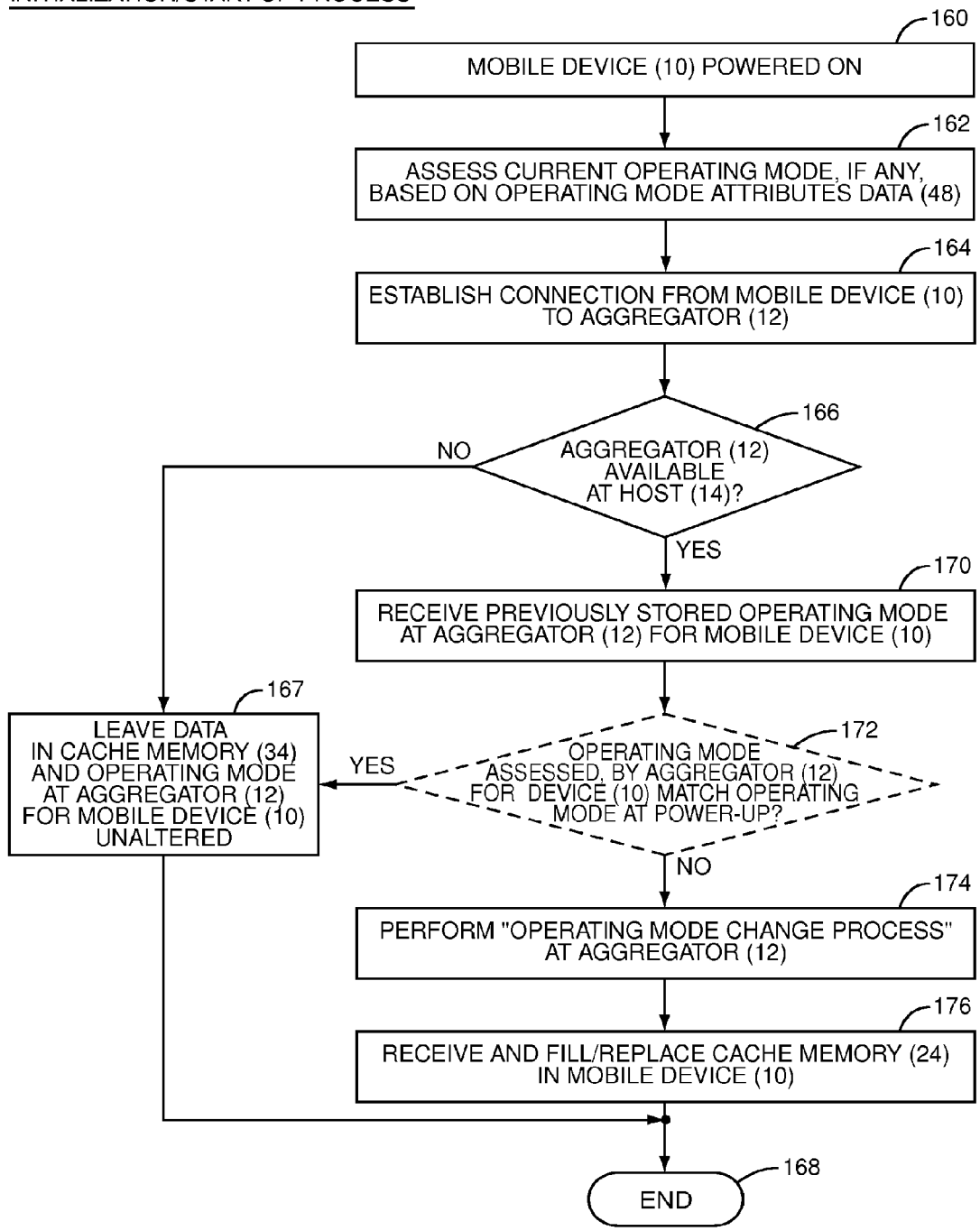
FIG. 6 is a flowchart illustrating an exemplary "initialization/start-up process" of the data probability management system and method for the mobile device according to one embodiment of the present invention.
Figure 7:
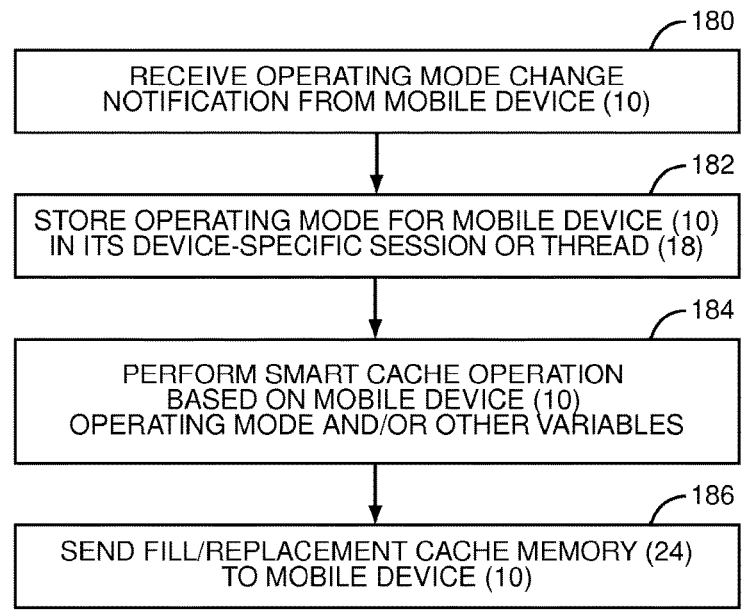
FIG. 7 is a flowchart illustrating an exemplary mobile device "operating mode change process" for the data probability management system and method for the mobile device according to one embodiment of the present invention.

The remainder of this application focuses on more specific details for exemplary embodiments of the present invention for providing the operating mode 40 of the mobile device 10 to the data aggregator 12 and replacing the mobile device data cache 24 in response. In particular, FIG. 6 is a flowchart illustrating more detail regarding the "initialization/start-up process" referenced in FIGS. 4 and 5. FIG. 7 is a flow chart illustrating more detail regarding the "operating mode change process" referenced in FIGS. 4 and 5. This process is performed when the mobile device 10 undergoes an operating mode change, since this action could require a data cache 24 replacement as part of the data probability management function. FIGS. 8-13 illustrate examples of assigning weights or probabilities to individual data services, or data items or types that are used as part of the data probability management function performed by the data aggregator 12 to determine the particular subset of user data to fill the data cache 24 to decrease the possibility of "cache misses." FIGS. 14 and 15 are flow charts illustrating more detail regarding the "smart cache" operation process that is performed by the data aggregator 12 to determine the particular subset of user data to fill the data cache 24 with after performing the data probability management function, and the "data request" process referenced in FIGS. 4 and 5.

FIG. 6 illustrates a flow chart to provide a more detailed example of the operations of the present invention that may be performed at initialization or start-up of the mobile device 10, consistent with the more general operation of step 102 in the flow chart of FIG. 4 and with the communication flow diagram in FIG. 5. An initialization/start-up process is performed so the mobile device 10 can "check in" with the data aggregator 12 to execute the data probability function and to fill, in the instance of initialization, or refill, in the instance of a subsequent start-up, the data cache 24 with user data most likely to be accessed by the user.

The process starts when the mobile device 10 is powered on (step 160). The mobile device assesses its current operating mode 44, if any, based on the operating mode attributes data 48. The mobile device 10 may perform a routine to determine the operating mode 40 and store such in the current operating mode field 44. Alternatively, the current operating mode field 44 could be non-volatile memory where the previous operating mode before shut down is still stored. Thereafter, the mobile device 10 establishes a connection with the data aggregator 12 (step 164). The data aggregator 12 may or may not be available depending on the status of the communication network 16 and/or the host 14. If the data aggregator 12 is not available (decision 166), whatever data is present in the data cache 24 of the mobile device 10 is retained (step 167). Also, the last known operating mode of the mobile device 10 stored at the data aggregator 12 is retained (step 167). The data aggregator 12 stores the operating mode 40 of the mobile device 10 to use as an input into the data probability function. Thereafter, the initialization/start-up process ends (step 168) until some other action occurs at the mobile device 10 that triggers a communication to the data aggregator 12 to determine if the data cache 24 should be filled and/or replaced, such as illustrated in decisions 104 and 108 in FIG. 4 relating to a data request at the mobile device 10 and an operating mode change at the mobile device 10, respectively.

If however, the data aggregator 12 is available at the host 14 (decision 166), the previously stored operating mode stored locally at the mobile device 10 is received by the data aggregator 12 as part of the data communication establishment (step 170). This is so the data aggregator 12 can determine whether there has been an operating mode change at the mobile device 10 versus the last known operating mode of the mobile device 10 stored at the data aggregator 12 (decision 172). If there is a match, this means that the mobile device 10 is not being initialized for the first time and that the user data in the data cache 24 should be retained, since the data previously provided by data aggregator 12 to the data cache 24 was based on the same operating mode. Alternatively, the data aggregator 12 may go ahead and perform the data probability function regardless of whether the current operating mode of the mobile device 10 matches the last known operating mode of the mobile device 10 stored at the data aggregator 12. This alternative may be performed in the event that the data probability function could produce a different result based on other factors regardless of whether the operating mode 40 of the mobile device 10 changed or not.

If the operating mode 40 has changed in decision 172, including if the mobile device 10 is being initialized for the first time such that a previous operating mode of the mobile device 10 did not exist at the data aggregator 12, the data aggregator 12 will perform an "operating mode change process" to perform the data probability function. Depending on the data probability function outcome, the data aggregator 12 may perform a replacement of the data cache 24 to increase the probability that subsequent data requests by the user of the mobile device 10 under the new operating mode can be fulfilled by the data in the data cache 24 as opposed to a "cache miss" (step 174).

FIG. 7 illustrates the "operating mode change process" at the host 14 performed by the data aggregator 12. As discussed above and illustrated in FIG. 6, the "operating mode change process" is performed by the data aggregator 12 in response to an operating mode change by the mobile device 10 so that the data probability function is executed to determine if a cache replacement in data cache 24 should be performed. The "operating mode change process" may be performed during initialization or start-up of the mobile device 10, as illustrated in the initialization/start-up process in FIG. 6, or in response to an operating mode change during the normal course of the mobile device 10 operating and reporting of same to the data aggregator 12, as illustrated in decision 108 and step 110 for the "overall process" in FIG. 4.

The "operating mode change process" starts in response to receiving an operating change notification from the mobile device 10 (step 180). The data aggregator 12 stores the updated operating mode for the mobile device 10 in its respective server session or thread assigned to the mobile device 10. This is because the data aggregator 12 is adapted to handle data probability operations and data cache 24 replacements for a multitude of different mobile devices 10 in its network. The data aggregator 12 then performs the data probability function for the mobile device 10 based in whole or part on the updated operating mode by performing the "smart cache operation" to determine if a data cache 24 fill (in the case of a mobile device 10 initialization) or replacement for the mobile device 10 should be performed (step 184). More information exemplifying how the data probability function may be performed via a "smart cache operation" at the data aggregator 12 is discussed below. If a data cache 24 fill or replacement is to be performed, the fill or replacement is sent to the mobile device 10 over the communication network 16, wherein the data cache 24 is updated (step 186). In the preferred embodiment, the data application proxy 28 takes responsibility for communicating and handling data cache 24 fills and replacements from the data aggregator 12 in the background impervious to the device application 26 or the user of the mobile device 10.

Figure 8:
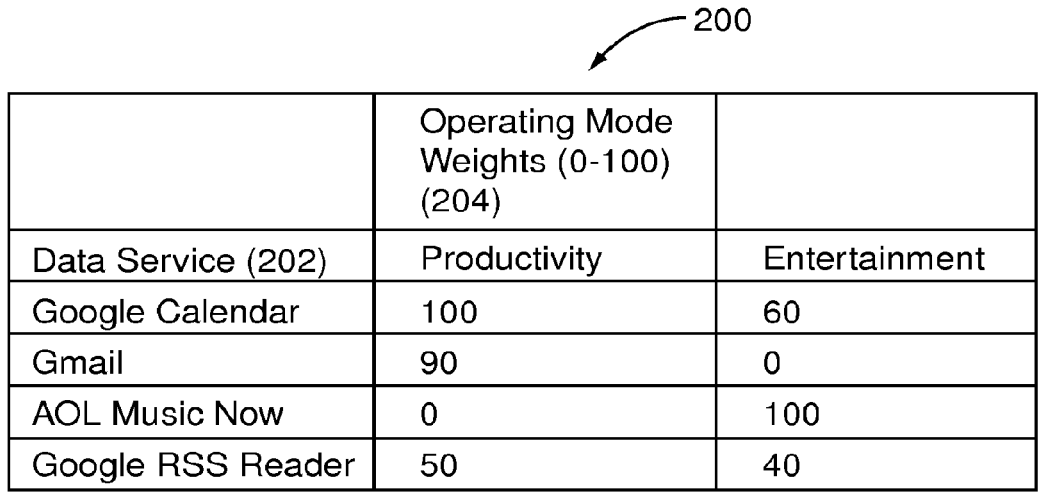
FIG. 8 is an exemplary mobile device data services weighting assignment based on operating mode to allow the data probability management system and method to manage data availability based on the mobile device operating mode according to one embodiment of the present invention.

FIGS. 8-13 provide examples of other variables that may be used by the data probability function performed by the data aggregator 12, in addition to the operating mode, to determine which user data to fill or replace the data cache 24 within the mobile device 10. These additional variables may enhance the likelihood that data service requests can be performed from data stored locally in the data cache 24 in the mobile device 10. FIG. 8, for example, illustrates data services weighting table 200 based on a given operating mode of the mobile device 10. The operating mode 40 of the mobile device 10 may be a first variable provided as part of the data probability function performed by the data aggregator 12. Thus, when the mobile device 10 is in a given operating mode, the data aggregator 12 will assign different weights to different data services or user data to increase the likelihood that data requests can be fulfilled locally by the mobile device 10 via the data cache 24. The weighting can be based on user settings or preferences or provided by the data service providers themselves, as will be described in more detail below.

For convenience only, only two of the five exemplary operating modes for the mobile device 10 are illustrated in FIG. 8. Those are the "productivity" and the "entertainment" operating modes. Exemplary data services 202 accessible by the user at the mobile device 10 are provided. For each data service 202, a weighting or ranking 204 may be provided for each operating mode. For example, when the mobile device 10 is in the "productivity" operating mode, a weighting of 100 is attributed to the "Google Calendar" data service. This means that there an absolute probability or interest in having "Google Calendar" data services available in the data cache 24 of the mobile device 10 when in "productivity" mode, as opposed to "AOL Music Service," which is weighted at a '0' or zero percent probability. Other data services are ranked based on perceived interest for a given operating mode. The weighting or ranking 204 may be provided by the user to the data aggregator 12 and associated with their account and/or data services provided by the host 14. Default settings may be applied by the data aggregator 12 if specific user provided weightings or rankings are not provided.

Figure 9:
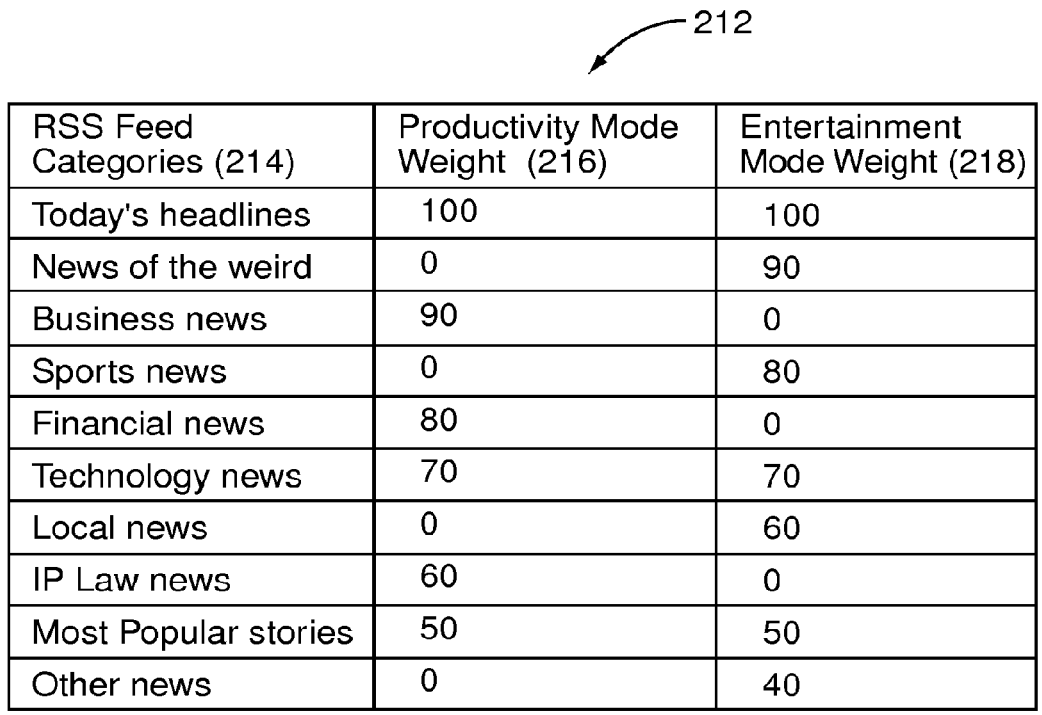
FIG. 9 is a second exemplary operating mode-based weighting assignment to allow the data probability management system and method to manage data availability according to one embodiment of the present invention.

A second variable that may be provided to the data aggregator 12 as an input to the data probability function is data-specific probability assignments. This allows rankings to be provided among different types of data within a given data service, especially since the data cache 24 may not be large enough to hold all of the data for a given data service without discrimination of some kind. This provides yet a further refinement and control of the data probability function and its capability to provide a higher degree of ability to provide data to the data cache 24 to avoid "cache misses." FIG. 9 illustrates another operating mode specific probability weighting table 212 example like that provided in FIG. 8 (i.e. "productivity" mode weighting 216 and "entertainment" mode weighting 218), but for Really Simple Syndication (RSS) feed categories 214, another type of data service may be provided to the mobile device 10 and a user of the mobile device 10.

An exemplary data-specific probability table 206 is illustrated in FIG. 10. As illustrated, a specific data service is provided, which is the "Google Calendar Event Time" 208 in the illustrated example. The user can specify weights or rankings 210 for different data services within the "Google Calendar Event Time" 208. Thus for example, the data for "This week" will be included in the data cache 24 as a result of the data probability function if the "Google Calendar" data is included based on the operating mode weighting (illustrated in FIG. 8). There is a lower probability that the data probability function executed by the data aggregator 12 will include the "6 weeks from now" data. Again, the user can select the weighting 210, or the data aggregator 12 can use default values instead. FIG. 11 illustrates another data-specific probability weighting table 220 and associated weighting 224 similar to that illustrated in FIG. 10, but for an "AOL Music Now music category" data service category 222 that may be provided to the mobile device 10 and a user of the mobile device 10.

Another variable used in the data probability function may be the recent usage of a particular data service or data item that is not located in the data cache 24 of the mobile device 10. In this manner, the individual data item or service's score could be raised outside the data-specific probability assignments by a value that would allow it to be prioritized above other data from the same data service. For example, the song "Funk Soul Brother" by Artist Fatboy Slim has a ranking of 90/100 as illustrated in the AOL Music Now Music data-specific table 222 illustrated in FIG. 11. If this song is chosen by the data probability function, as executed by the data aggregator 12, to be placed into the data cache 24 of the mobile device 10, the data aggregator 12 could be instructed to raise the ranking of this song in particular by a small data value, for example to 91/100. This could ensure that this song would have a higher probability of being included in the data cache 24 download from the data aggregator 12 when the data probability function is executed. Furthermore, the data aggregator 12 could be programmed such that subsequent accesses to the song could raise the ranking in a progressive manner (e.g. +2, +4, +8, +16) such that by the fourth access in this example, the song would effectively rank 105 (e.g. 90+1+2+4+8), and be guaranteed to be in the mobile device data cache 24.

With the preceding weighting examples for data services, the data probability function then combines the relative rankings for the data services and items based on the input variables of an operating mode, data-specific weightings, and data usage, to form one linear list. Examples of these lists are illustrated in FIG. 12 and FIG. 13, with the list 226 in FIG. 12 resulting when the mobile device 10 is in the "productivity" mode, and list 230 in FIG. 13 resulting when the mobile device 10 is in the "entertainment" mode. The data probability function, in this example, formed these lists according to the following formula:

((Operating Mode Rank)*10*(Data-specific probability+Usage modifier))/1000

As illustrated in FIG. 12, the "Appointments This week" data service is ranked highest in the resultant ranking field 228 for "productivity mode." In FIG. 13, the "Artist—U2" is ranked highest in the resultant ranking field 232. The data aggregator 12 will provide the data services and user data in the linear list in order of ranking according to the data size available in the data cache 24. If all of the data resulting from the ranking can be stored in the data cache 24, the data aggregator 12 will send all the resulting data to the mobile device 10. But if not, which is likely the case during normal operations, the data aggregator 12 will select data from the resulting lists by rank order until the data cache 24 is full.

Now that examples have been given of how the data probability function inputs may be provided based on operating mode attribute data 48, user data rankings, and/or user activity on the mobile device 10, the flow chart of FIG. 14 is provided to illustrate an exemplary embodiment of how the data probability function, in the form of the "smart cache operation" process, is performed at the data aggregator 12. The "smart cache operation" process is performed in response to any event that is designed to signify a possible different probability of user data access by the user at the mobile device 10 such that the data cache 24 may need to be replaced to reduce the probability of "cache misses." The "smart cache process" updates the probabilities for different types of user data that may be accessed by the user, and thus in turn controls which data is replaced in the data cache 24 to provide a lower probability of a data cache miss in the data cache 24 during user data requests at the mobile device 10.

The process starts by performing a data probability function after receiving any updates and generating data rankings for the available user data services for the mobile device 10 at the data aggregator 12 in response (step 250). As shown and discussed previously with respect to FIGS. 8-13, different operating modes 40 and user assigned different weights to different types of data within a given data type or set can control or be used to perform the data probability function. As discussed above and illustrated in FIGS. 12 and 13 in particular, the operating mode and user data weighting allows the data aggregator 12 to rank probabilities of data access to use in replacing the data cache 24 in the mobile device 10 based on the operating mode 40 of the mobile device 10. The data probability function may also performed as a function of the user activity at the mobile device 10 reported by the mobile device 10 from the current activity field 60 in memory 34.

The data aggregator 12 then determines if the "smart cache process" was initiated as a result of a "cache miss" at the mobile device 10 (decision 252). If not, the process ends since no further information or activity was performed that could affect the data probability function in assigning probabilities to the user data to use in replacing the data cache 24 (step 256). If the "smart cache process" was initiated as a result of a "cache miss" at the mobile device 10, the data probability function may additionally increase the ranking of the data item requested that caused the "cache miss" in the data rankings of the user data at the data aggregator 12 (step 254). This allows exceptions to be made to the ranking of user data by the data probability function based on specific data requests made by the user to further increase the likelihood that subsequent data requests can be fulfilled by data in the data cache 24 as opposed to a "cache miss." Repeated requests for particular data by a user are an indication of a greater likelihood the data may be requested again. Depending on the weighting assigned to a particular data service, the resulting ranking may still be lower than other data services such that the particular data service will not be chosen by the data probability function to be stored in the data cache 24 of the mobile device 10. Thus, by the present invention also allowing the data probability function to further automatically adjust the weighing of particular data services in response to cache misses, this improves the user experience.

FIG. 15 illustrates an exemplary process performed when a data request is made by the user at the mobile device 10 called the "data request" process. Data requests are either fulfilled by the data in the data cache 24 at the mobile device 10 or they generate a "cache miss" that is reported to the data aggregator 12. In turn, the data aggregator 12 may replace the data cache 24 depending on the operating mode 40, user assigned weighting to user data, and/or user activity on the mobile device 10 to determine which data to use to replace the data cache 24.

The process starts by determining if data is being requested by the user at the mobile device 10 (decision 270). If not, the process repeats until a data request is received. After a data request is received, the mobile device 10 attempts to access the requested data from the cache data 24 via the data application proxy 28 to determine if available locally (decision 272). If so, the data request is fulfilled to the user at the mobile device 10 from the data cache 24 (step 274), and the process repeats waiting for the next data request to be received (decision 270). If however, the data requested is not available in the data cache 24, this is a "cache miss." The user is notified of the pending retrieval of the requested data on the mobile device 10 (step 278) since the mobile device 10 will attempt to establish a connection with the data aggregator 12 to retrieve the specific data requested by the user (step 280). If the requested data is not available, either by not being present at the data aggregator 12 or because the mobile device 10 could not establish a connection to the data aggregator 12 (decision 282), the user is notified of the data unavailability (step 284).

If, on the other hand, the data requested is available from the data aggregator 12, the data aggregator 12 provides the requested data (step 286). Depending on the nature of the requested data and the number of "cache misses" for the requested data, the data aggregator 12 may also perform the "smart cache operation" process and/or adjust the ranking of the particular data item requested. In this manner, cache miss probabilities are reduced. If the data aggregator 12 performs the data probability function such that a cache replacement is warranted, the data aggregator 12, in addition to providing the requested data, will also provide a cache replacement for the data cache 24 in the mobile device 10.

Please note that the memory provided in the mobile device 10 to store the user's data and/or data services does not necessarily have to be cache memory. This memory may be any type of memory, including volatile and non-volatile memory. The data aggregator 12 may be provided at a host system 14 or at another system or location, including at a super peer device to the mobile device 10. The data aggregator 12 may be located at a cellular carrier since the mobile device 10 often may be a cellular phone device. The user data and/or data services provided to the mobile device 10 and accessed by the user of the mobile device 10 may be any type of data or services.

Those skilled in the art will recognize improvements and modifications to the preferred embodiments of the present invention. All such improvements and modifications are considered within the scope of the concepts disclosed herein and the claims that follow.

What is claimed is:

1. A system for increasing availability of a data collection, the system comprising components including:
    a hardware server having a first processor and comprising:
        a communication network interface; and
        a data aggregator operably executed by the first processor, the data aggregator associated with the communication network interface and adapted to:
            accept a communication session with a mobile device;
            send previously stored operating mode information to the mobile device;
            receive, during operation of the mobile device, an operating mode message comprising operating mode information for the mobile device, the operating mode information indicating data services likely to be requested by a user at the mobile device during operation of the mobile device;
            replace the previously stored operating mode information with the operating mode information;
            determine a subset of data among the data collection that is likely to be accessed at the mobile device based on the operating mode information; and
            send the subset of data to the mobile device; and
    the mobile device having a second processor and comprising:
        a data cache for storing the subset of data from a data collection;
        a communication interface adapted to establish communication with the data aggregator having access to the data collection; and
        a control system operably executed by the second processor, the control system adapted to:
            receive the previously stored operation mode information;
            determine an operating mode of the mobile device;
            send the operating mode message including the operating mode information of the mobile device to the data aggregator;
            receive the subset of data from the data aggregator that is likely to be accessed at the mobile device based on the operating mode information of the mobile device; and
            store the subset of data in the data cache.

2. The system of claim 1 wherein the control system is adapted to send the operating mode message to the data aggregator in response to an activity on the mobile device.

3. The system of claim 1, wherein the data collection comprises at least one type of data comprised from user data, data services, and data applications.

4. The system of claim 1, wherein the data collection is weighted based on the operating mode of the mobile device.

5. The system of claim 1, wherein the data aggregator of the hardware server is further adapted to send a user perceptible form of the subset of data to the mobile device.

6. The system of claim 1, wherein in determining the subset of data, the data aggregator of the hardware server executes a data probability function.

7. The system of claim 6, wherein in executing the data probability function, the data aggregator of the hardware server is further adapted to include in the subset of data, data from the data collection based on a weighting of data types within the data collection.

8. The system of claim 7, wherein the data aggregator of the hardware server is further adapted to receive an instruction regarding the weighting of the data types within the data collection.

9. The system of claim 7, wherein the data aggregator of the hardware server is further adapted to assign a default weight value to the data types within the data collection.

10. The system of claim 6, wherein in executing the data probability function, the data aggregator of the hardware server is further adapted to receive a data probability function updating message, and the data aggregator of the hardware server updates the data probability function in response to the data probability function updating message.

11. The system of claim 10, wherein the data probability function updating message includes a software function plug-in.

12. The system of claim 1, wherein in sending the subset of data to the mobile device, the data aggregator of the hardware server is further adapted to progressively send the subset of data among the data collection to the mobile device.

13. The system of claim 1, wherein in sending the subset of data to the mobile device, the data aggregator of the hardware server is further adapted to send the subset of data among the data collection to the mobile device in real time.

14. The system of claim 1, wherein the subset of data is digital rights management (DRM) protected data and the data aggregator of the hardware server is further adapted to facilitate handling of the DRM data such that the mobile device does not require a license to consume the subset of data.

15. The system of claim 1, wherein the data aggregator of the hardware server is further adapted to:
    automatically determine the subset of data based on a previous operating mode of the mobile device, to determine a reversionary subset of data among the data collection that is likely to be accessed at the mobile device based on the previous operating mode; and
    send the reversionary subset of data among the data collection to the mobile device after a timeout period expires.

16. The system of claim 1, wherein the control system of the mobile device sends the operating mode message as a result of a data request at the mobile device.

17. The system of claim 16, wherein the control system of the mobile device further transitions to a different operating mode in response to determining a pattern of the data requests indicating an operating mode different from the operating mode included in the sent operating mode message.

18. The system of claim 1, wherein the control system of the mobile device sends the operating mode message as a result of an operating mode change at the mobile device.

19. The system of claim 1, wherein the operating mode message is further comprised of data comprised from the group consisting of data generated by the control system of the mobile device in response to user activity, a location of the mobile device, a time at the mobile device, a date at the mobile device, capabilities of the mobile device, and a user profile stored in the mobile device.

20. The system of claim 1, wherein the control system of the mobile device sends the operating mode message in response to a cache miss at the mobile device.

21. The system of claim 1, wherein the subset of data provides availability of the data collection without requiring persistent storage of the complete data collection on the mobile device.

22. The system of claim 1, wherein the mobile device further comprises a data proxy coupled to the data cache that is accessible by the control system, wherein the control system is further adapted to access the subset of data in the data cache through the data proxy.

23. The system of claim 1, wherein the control system of the mobile device is further adapted to receive a user perceptible form of the subset of data.

24. The system of claim 1, wherein the control system of the mobile device is further adapted to send the operating mode message to the data aggregator in response to an operating mode change on the mobile device.

25. The system of claim 1, wherein the control system of the mobile device is further adapted to progressively receive the subset of data among the data collection from the data aggregator.

26. The system of claim 1, wherein the control system of the mobile device is further adapted to receive the subset of data among the data collection from the data aggregator in real time.

27. The system of claim 1, wherein the control system of the mobile device is further adapted to:
receive a reversionary subset of data among the data collection from the data aggregator based on a previous operating mode of the mobile device after a timeout period expires; and
store the reversionary subset of data in the data cache.

28. The system of claim 1, wherein the control system of the mobile device is further adapted to change the operating mode of the mobile device in response to a request at the mobile device.

29. A method for increasing availability of a data collection, comprising the steps of:
accepting a communication session with a mobile device;
sending previously stored operating mode information to the mobile device;
receiving, during operation of the mobile device, an operating mode message comprising operating mode information for the mobile device, the operating mode information indicating data services likely to be requested by a user at the mobile device during operation of the mobile device;
determining a subset of data among the data collection that is likely to be accessed at the mobile device based on the operating mode information; and
sending the subset of data to the mobile device.

30. A hardware server comprising:
a communication network interface; and
a data aggregator associated with the communication network interface, wherein the data aggregator is adapted to:
establish a communication session with a mobile device;
send previously stored operating mode information to the mobile device;
receive, during operation of the mobile device, an operating mode message comprising operating mode information for the mobile device, the operating mode information indicating data services likely to be requested by a user at the mobile device during operation of the mobile device;
replace the previously stored operating mode information with the operating mode information;
determine a subset of data among the data collection that is likely to be accessed at the mobile device based on the operating mode information; and
send the subset of data to the mobile device.

31. A mobile device that is capable of accessing a data collection, comprising:
a data cache for storing a subset of data from a data collection;
a communication interface adapted to establish communication to a data aggregator having access to the data collection; and
a control system, wherein the control system is adapted to:
receive previously stored operation mode information from the data aggregator;
determine an operating mode of the mobile device;
send an operating mode message including the operating mode of the mobile device to the data aggregator in response to an activity on the mobile device;
receive a subset of data from the data aggregator that is more likely to be accessed at the mobile device based on the operating mode of the mobile device;
store the subset of data in the data cache; and
send another operating mode message to the data aggregator in response to a cache miss to the data cache.

32. A non-transitory computer readable medium, comprising:
software, wherein the software is adapted to execute on a microprocessor to:
accept a communication session with a mobile device;
send previously stored operating mode information to the mobile device;
receive, during operation of the mobile device, an operating mode message comprising operating mode information for the mobile device, the operating mode information indicating data services likely to be requested by a user at the mobile device during operation of the mobile device;
replace the previously stored operating mode information with the operating mode information;
determine a subset of data among the data collection that is likely to be accessed at the mobile device based on the operating mode information; and
send the subset of data to the mobile device.

* * * * *